Patented Feb. 13, 1951

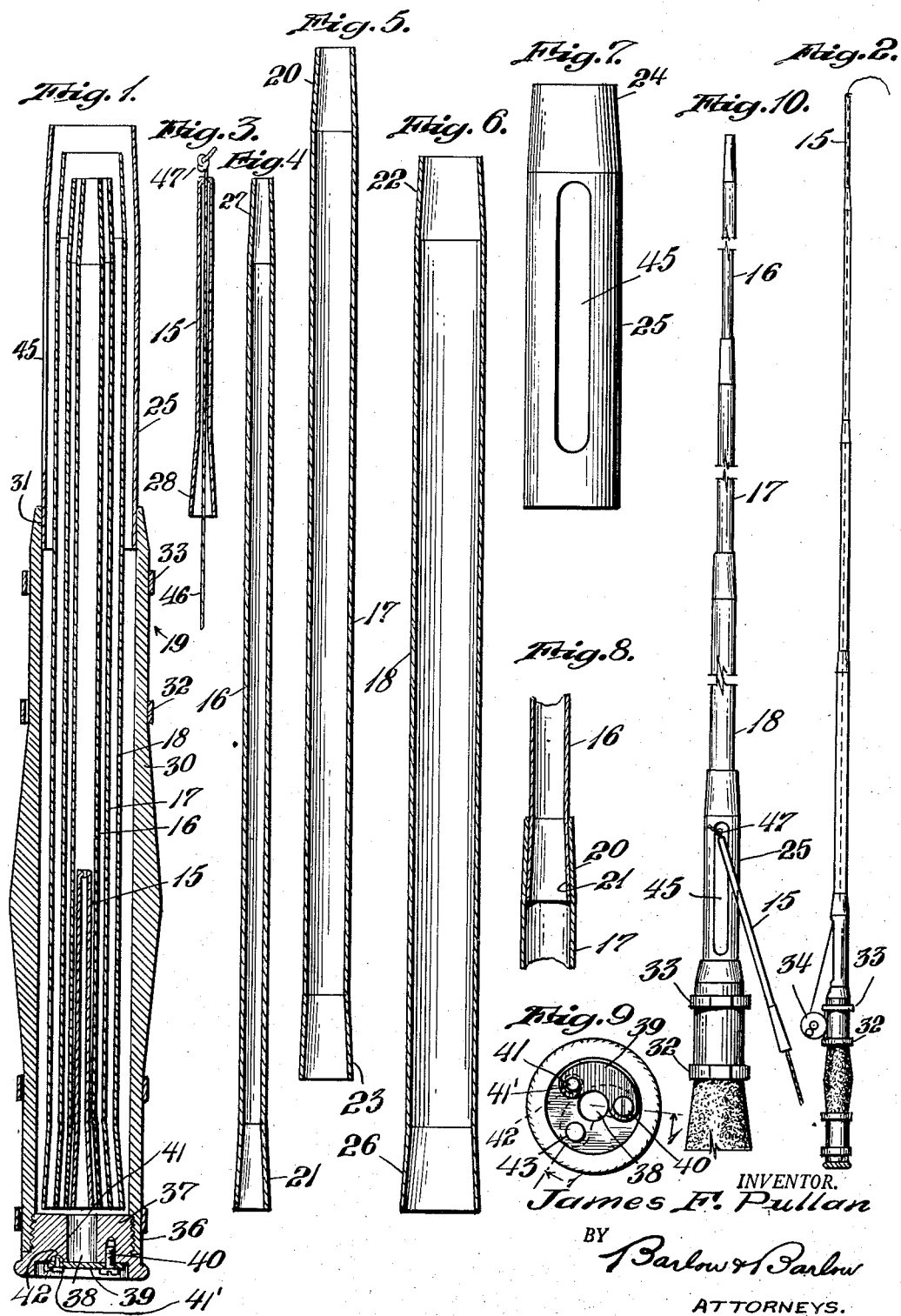

2,541,609

UNITED STATES PATENT OFFICE 2,541,609

FISHING ROD

James Francis Pullan, Pawtucket, R. I.

Application February 21, 1947, Serial No. 730,104

5 Claims. (Cl. 43—19)

1

This invention relates to a fishing rod such, for instance, as is used for fly or casting rods.

In many cases, the fishing rod is formed of several sections for convenience in storage or carrying separately side by side, and these sections are assembled one on the other. Such a rod usually has eyes or leaders which guide the fishing line from the reel to the end of the rod, and it is necessary to pass the fishing line through each of these leaders after the rod is assembled.

One of the objects of this invention is to provide a fishing rod which is formed of sections and is collapsible upon itself with each section nesting in the next section of the assembly.

Another object of this invention is to provide a fishing rod formed of tubular sections with a fishing line extending through each of the sections rather than along its outer surface.

Another object of this invention is to provide an easy means of threading the fishing line through the fishing rod.

More specifically an object of this invention is to utilize one small end section of the fishing rod as a shuttle for threading the fishing line through the fishing rod.

A further object of the invention is to provide a means for storing the small end section which is used as a shuttle in threading and for removing it from such position in the fishing rod.

With these and other objects in view, the inventions consists of certain novel features of construction as will be more fully described and particularly pointed out in the appended claims.

In the accompanying drawings:

Fig. 1 is a sectional view of the fishing rod on substantially line 1—1 of Fig. 9 with the cover in closed position and with its several sections in collapsed position all held within the large handle section;

Fig. 2 is an elevation illustrating the fishing rod extended and complete with the same threaded and a reel in position thereon;

Fig. 3 is a sectional view of the smallest section which is used as a shuttle for threading the fishing line through the fishing rod when in extended position;

Figs. 4, 5 and 6 are sectional views of progressively different size sections of the fishing rod;

Fig. 7 is an elevation of a part of the handle section showing the slot therein for the reception of the shuttle section;

Fig. 8 is a sectional view illustrating the manner of two sections fitting together;

Fig. 9 is an end view illustrating the closure device for the butt end of the handle section; and

2

Fig. 10 is an elevation showing somewhat fragmentally but illustrating the tip or shuttle section as being inserted through the slot in the handle section.

In proceeding with this invention, I have provided a plurality of tubular sections with the end of one section reduced and the end of the other section slightly flared so that these sections may frictionally fit tightly together when pulled out in extended position so as to maintain the sections in their desired rigid relationship. The handle section is slotted so that the smallest end section may pass through this slot and by knotting the fishing line at the end of this shuttle section, this section may be passed through the other sections so as to draw the fishing line through these sections for the threading of the fishing line in the fishing rod. This shuttle section will, with the other sections, be housed within the handle section and an opening will be provided in the butt end so that just the shuttle section will pass through it. A convenient cover for this opening will also prevent this passage when the rod is to be stored or carried.

With reference to the drawings, I have provided a plurality of tubular sections, the smallest section being designated 15 which I term as a shuttle section, while the other sections designated 16, 17, 18 and 19 are all tubular sections each progressively of a larger diameter so as to receive within it the next smaller section. The outer end of each of these sections is tapered inwardly as at 20 (see Figs. 5 and 8), while the inner end of the next section 21 (see Figs. 4 and 8) will be flared outwardly so that as the section 16 is pulled outwardly from the section 17 which receives it, this flared end 21 will engage the inner surface of the inwardly tapered end 20 and tightly friction therewith and be maintained in this relatively extended position, such as shown in Fig. 2 or Figs. 8 and 10. The same sort of a friction joint occurs between the end 22 of the section 18 and end 23 of the section 17 and between the end 24 of the part 25 of the handle section and the end 26 of the section 18. Likewise, the same joint occurs between the inwardly tapered end 27 of the section 16 and outwardly flared portion 28 of the shuttle section 15.

The handle section 19 consists of the metal portion 25, as shown in Fig. 7, which is received in the larger portion 30 and is fixed thereto as at 31. This portion 30 has upon it the bands 32 and 33 for holding the reel 34 (see Fig. 2) in position. This portion 30 is tubular and is threaded as at 36 and a closure plug 37 is threaded into the end 36 as is shown in Fig. 1. This plug has an opening 38 through it of a size to permit the shuttle section 15 to pass therethrough. A cover 39 is pivoted as at 40 and will swing about this pivot 40 from the open position shown in Fig. 9 to the closed position shown in dotted lines in Fig. 9. A pin 41' frictionally retained in plate 39 forms a handle on the outer surface and an inwardly extending protuberance 41 will lodge in a recess 42 to hold the cover in open position, as shown in Fig. 9, or will lodge in a recess 43 to hold the cover in closed position, as shown in dotted lines in Fig. 9 or in full lines in Fig. 1.

A slot 45 of a dimension to receive through it the shuttle 15 is provided in the metal portion 25 of the handle section 19.

The sections will all telescope one within the other, as shown in Fig. 1, to provide a compact assembly of this sectional fishing rod. If it is desired to use the rod, the shuttle section 15 will be removed from the assembly shown in Fig. 1 by opening the cover 39 and withdrawing the section 15 from this position. As this opening is only of a size to permit passage of section 15, the other sections cannot pass therethrough, it being necessary to remove the plug 37 in order that this may be accomplished. After the shuttle section 15 is removed, the rod is then moved to extended position, as shown in Fig. 10, and this fishing rod then is easily threaded with the fishing line 46 which is passed through the shuttle section 15 and knotted as at 47 (Figs. 2 and 10). This shuttle section is then passed through the slot 45, as shown in Fig. 10, and then by swinging and abruptly stopping the rod, the shuttle section will pass through the other tubular sections and emerge from the section 16, as shown in Fig. 2, from whence the fishing line may be attached to the hook or the like and the reel may be fastened to the handle section by bands 32 and 33, and the fishing rod is ready to be used.

I claim:

1. A fishing rod comprising a plurality of tubular sections of progressively different size adapted for nesting in telescoped relation one within the other in collapsed position or with the end portions of one section secured to the end portions of the next section when in extended position, one of the larger sections having a slot through the wall thereof, which slot is of a size to receive therethrough the smallest end section to act as a shuttle to pass the fishing line through the tubular sections when in extended position.

2. A fishing rod as in claim 1 wherein the slot is in the largest section, and means for holding a reel fixed to said section adjacent said slot.

3. A fishing rod as in claim 1 wherein a handle is formed on said largest section and said slot is in the largest section adjacent said handle and a reel is provided adjacent said slot.

4. A fishing rod comprising a plurality of tubular sections of progressively different size adapted for nesting in telescoped relation one within the other in collapsed position or with the end portions of one section secured to the end portions of the next section when in extended position, the largest of said sections serving as a container for said other sections, a closure at the base end of said largest section having an opening therein of a size to pass therethrough the smallest section only, and a removably mounted cover for said opening.

5. A fishing rod comprising a plurality of tubular sections of progressively different size adapted for nesting in telescoped relation one within the other in collapsed position or with the end portions of one section secured to the end portions of the next section when in extended position, the largest of said sections serving as a container for said other sections, a closure at the base end of said largest section having an opening therein of a size to pass therethrough the smallest section only, and a movably mounted cover for said opening, one of the larger sections having a slot therein of a size to receive therethrough the smallest end section to act as a shuttle to pass the fishing line through the tubular sections when in extended position.

JAMES FRANCIS PULLAN.

REFERENCES CITED

The following references are of record in the file of this patent:

UNITED STATES PATENTS

| Number | Name | Date |
|---|---|---|
| 164,828 | Graves | June 22, 1875 |
| 287,809 | Devereux | Nov. 6, 1883 |
| 580,896 | Quackenbush | Apr. 20, 1897 |
| 1,473,162 | Sage | Nov. 6, 1923 |
| 1,595,275 | White | Aug. 10, 1926 |
| 2,276,524 | Taylor | Mar. 12, 1942 |

FOREIGN PATENTS

| Number | Country | Date |
|---|---|---|
| 146,755 | Great Britain | July 15, 1920 |